E. C. SMITH.
MOWING MACHINE.
APPLICATION FILED OCT. 31, 1912.
1,146,967.
Patented July 20, 1915.
3 SHEETS—SHEET 1.
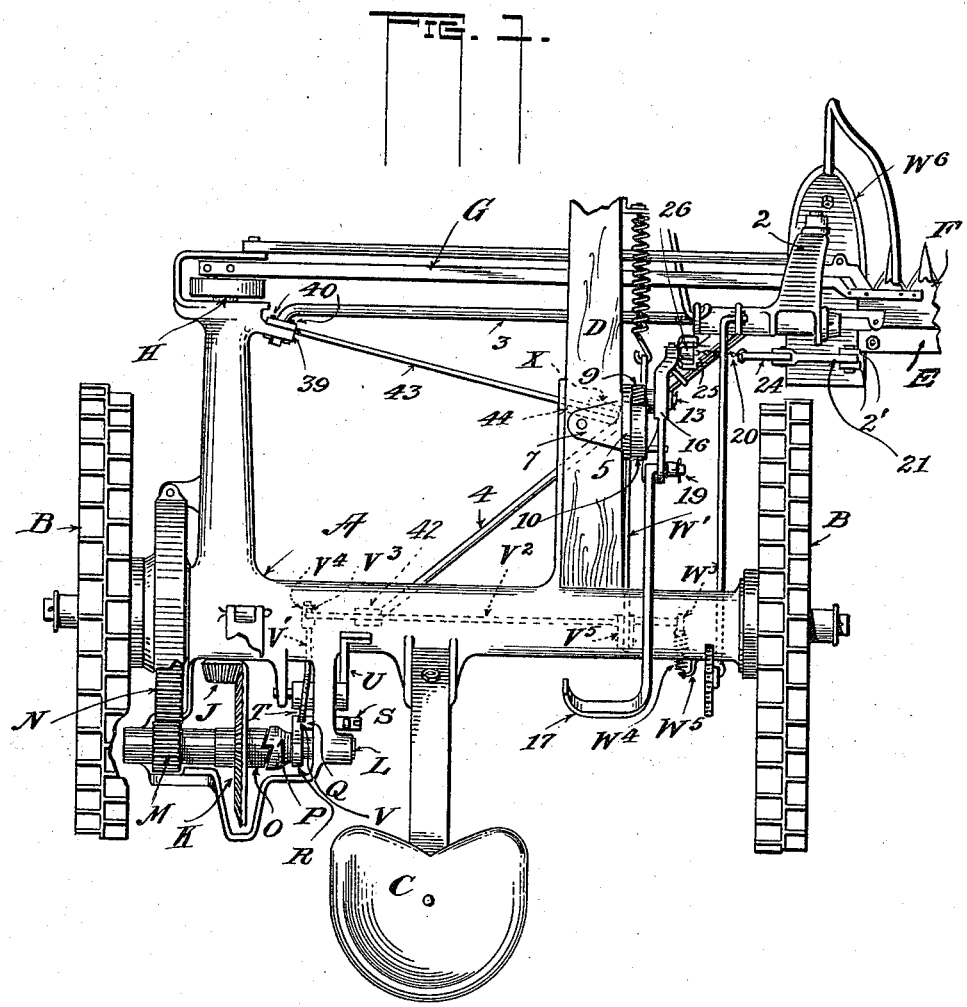
Witnesses:
Elsie Wilkinson
Eunice Beckum
Inventor:
Ernest C. Smith
By L. M. Thurlow
Atty.

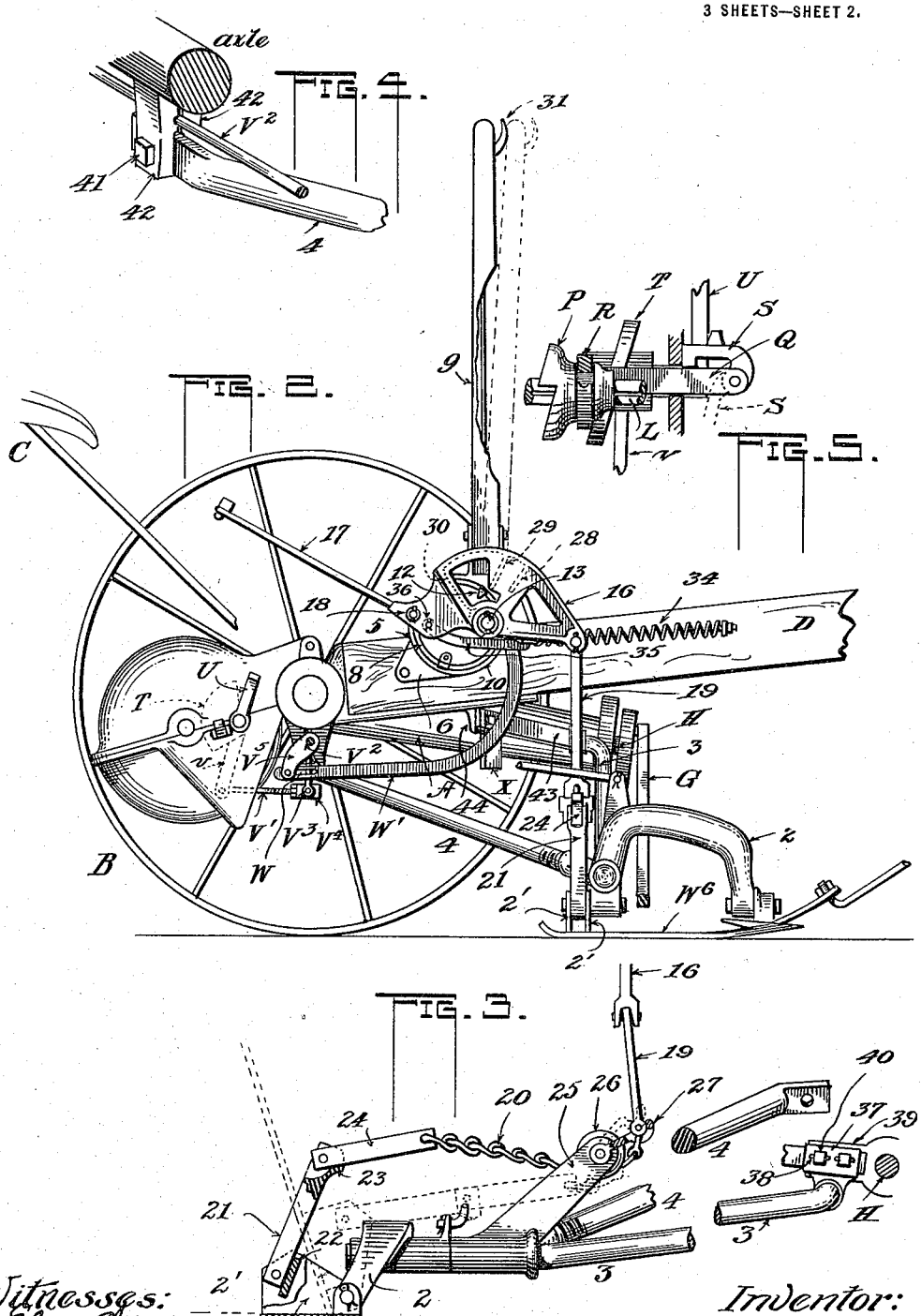

E. C. SMITH.
MOWING MACHINE.
APPLICATION FILED OCT. 31, 1912.
1,146,967.
Patented July 20, 1915.
3 SHEETS—SHEET 3.
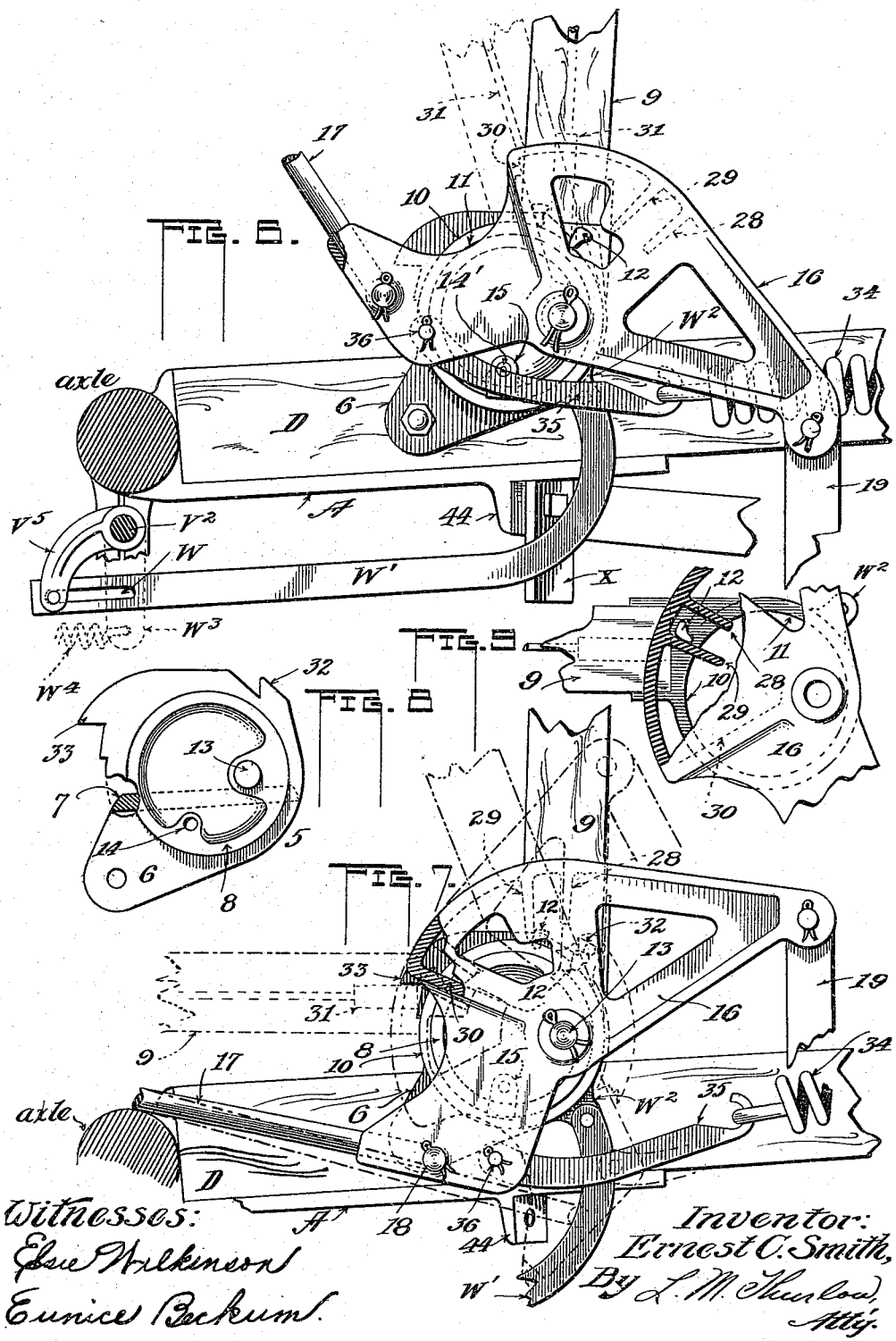

UNITED STATES PATENT OFFICE.

ERNEST C. SMITH, OF PEORIA, ILLINOIS, ASSIGNOR TO ACME HARVESTING MACHINE CO., OF PEORIA, ILLINOIS, A CORPORATION OF WEST VIRGINIA.

MOWING-MACHINE.

1,146,967.   Specification of Letters Patent.   Patented July 20, 1915.

Application filed October 31, 1912. Serial No. 728,908.

*To all whom it may concern:*

Be it known that I, ERNEST C. SMITH, citizen of the United States, residing at Peoria, in the county of Peoria and State of Illinois, have invented certain new and useful Improvements in Mowing-Machines; and I do hereby declare that the following is a full, clear, and exact description of the invention, which will enable others skilled in the art to which it appertains to make and use the same.

This invention has reference to improvements in mowing machines.

One of the important objects of the invention is to provide a system of leverages for lifting the finger bar with the least amount of effort through a primary and a secondary lever.

The object of a secondary lever movement to complete the extreme raising movement of the finger bar in a mower is that when said finger bar is given its full upward swing, or the movement from a horizontal to a substantially vertical position by one movement or sweep of a single lever, the weight imposed upon said lever is so great as to make the operation an extremely difficult one for the operator.

Another important object, also, as distinguished from other lifting mechanisms for mowers, is to provide a more simple structure in a primary lever for imparting the initial lifting movement to the finger bar, and provide a more simple structure in a secondary lever, spacing the axes of the levers from one another in order that the parts of one lever will move eccentrically to those of the other lever and in doing so be brought into the path of movement of one another.

Still another object, as distinguished from the structures of other mowers, is to provide means by which the finger bar will be caused to be positively carried down to its position for work so that the sickle will be practically in line with the driving pitman before the clutch mechanism of the mower is thrown into engagement thereby eliminating all chance of breakage of the parts.

Still another object is to provide a peculiar arrangement of members by which to lift the outer end of the cutter bar.

Besides the above, the invention relates to certain details of construction and arrangement of parts as will be pointed out in the following specification and the claims aided by the accompanying drawings, in which, Figure 1 is a plan of the mower. Fig. 2 is a side elevation of the same. Fig. 3 is an elevation, in detail, of lifting mechanism for raising the finger bar. Fig. 4 shows in perspective a portion of a push-bar used as an alining bar for the finger bar, showing its connection with the mower frame. Fig. 5 is an elevation of a clutch portion and a latch. Fig. 6 is a side elevation of a primary and a secondary lever and certain parts connected therewith, all being shown on a much larger scale than in Fig. 2. Fig. 7 is a similar view showing the parts in altered positions. Fig. 8 is a side elevation of a bracket or support for a secondary lever. Fig. 9 shows parts of a primary and secondary lever with portions of both broken away.

A indicates the frame of the mower and B the ground wheels or driving wheels.

C is the seat, D the tongue, E the finger bar, and F the sickle operated by the usual pitman G.

Motion is imparted to the pitman in the usual way through a shaft H carrying a bevel pinion J. In mesh with the pinion is a bevel gear K on a shaft L mounted at the rear side of the mower frame, rotation being imparted through a pinion M on said shaft and a gear N operated from one of the ground wheels as is customary.

The hub O of the bevel gear K is made to constitute a clutch portion and a clutch portion P is slidable upon the shaft L and adapted to engage said portion O. The clutch part P rotates with the shaft L the gear K being idle but when the clutch parts are in engagement rotation is imparted to the pinion J.

Slidably carried in a part of the frame A, Fig. 5, is a clutch shifting member Q having a part R to engage the said clutch part P and shift that member. Pivoted to the outer end of the member Q is a latch S which normally hangs downward as indicated in broken lines in Fig. 5 when the clutch parts are in engagement. However, when it is desired to permanently disengage the clutch the part P is shifted away from the part O by the foot lever for example and the latch is placed in the position shown in full lines in said Fig. 5, one end bearing against the frame part A as shown in said Fig. 5.

Upon a part of the mower frame forward of the shaft L a cam T is mounted in suitable manner which engages a notch V in the member Q described and through which the clutch is operated by a movement of a foot lever U, or automatically through parts to be described, when the finger bar is raised.

The means through which to automatically disengage the clutch parts will now be described. Depending from the cam is an arm v, Figs. 2 and 5, to which is pivoted at one end of a rod V' extending forward from said arm and preferably threaded at its forward end. Journaled beneath the axle of the mower in any good manner is a rock shaft V² one end having a depending arm V³ to which is pivoted a threaded sleeve V⁴ to receive the threaded end of the rod V' and in which the latter is adjustable. Near its other end the shaft V² carries a depending arm V⁵ the free end having a part to extend through a slot W in a rod W' which rod extends forward and upward and has pivotal attachment to an extension W² on a part of a hand lever to be described later, the slot W being provided in order that the foot lever U may be operated independently of the other parts. Depending from the rock shaft, also, is an arm W³, shown in dotted lines in Figs. 1 and 6, to which is attached one end of a spring W⁴, the other end of which is attached to any suitable part of the frame as, for instance, an arm W⁵, Fig. 1. The tendency of the spring at all times is to hold the clutch portions O P in engagement.

The finger bar E is secured on the usual inner shoe W⁶ pivotally carried on a yoke 2. To said yoke is connected the drag-bar 3 and a push-bar 4 both of which have pivotal connection with the mower frame and adjustable in a manner to be described herein, and constituting what will be termed a coupling frame.

Mounted on the tongue D is a cast bracket 5 (Fig. 8) including an ear 6 to secure it to the side of said tongue and including, also, a part 7 to secure it to the top of that member. This bracket is provided with a circular flange 8 extending outward from its side and lying in a vertical plane and constituting a support and bearing for a hand lever, previously referred to, indicated at 9. The part of said lever 9 supported on the flange 8 is indicated clearly at 10 in Fig. 9. This consists preferably of a casting provided with a circular opening 11 to receive the said flange 8 and included with said casting is the lug W² previously referred to carrying the rod W'. The part 10 also includes a lug 12 the purpose of which will appear later herein.

The bracket 5 besides including the flange 8 has a stud 13 extending outward therefrom at its side and spaced on a horizontal line forward of the point from which the circular flange 8 is described. Preferably also there is a threaded hole 14 in the casting to receive a set screw 14' by which the casting 10 is held in place upon the flange by means of a depending ear 15, Fig. 6, but this is a mere detail and other means may be substituted for it. But it allows the casting 10 to freely rock on the flange but prevents it slipping off. Mounted upon the stud 13 is a casting 16 forming a part of a foot lever 17.

This casting 16 comprises a part extending forward from the pivot formed by the stud and a part extending rearward therefrom. The latter part carries the foot lever 17 referred to consisting of a bar having a right angle extension 18 extending through it and adapted to pivot in the hole that receives it. The rear end of the lever is bent to provide a convenient rest for the foot of the operator by which the said foot lever can be actuated.

Pivotally suspended from the forward end of the casting 16 is a link 19 shown in full in Figs. 2 and 3. Attached to the lower end of the link is a chain 20. Uprising from the shoe W⁶ is a pair of extensions 2' and between them is pivoted an arm 21, which, when the finger bar lies in its position for work, bears against a stop 22 of said extensions 2'. The upper end of the arm is bifurcated and has a stop portion 23 upon which bears a second arm 24 pivoted between the bifurcations, the other end of the arm 24 having the chain 20 attached to it, Fig. 3.

Uprising from the coupling into which the drag and push bars 3 and 4 respectively are connected is an arm 25 carrying a roller 26 beneath which the said chain 20 extends. Pivoted on the arm 25, for instance at the axis of the roller 26, is a member or link 27 through the outer end of which the chain 20 extends. This link 27 of itself is not new but in conjunction with the arms 21 and 24, previously described, provides a peculiarly effective means for lifting the outer end of the finger bar and for letting it drop into places lower than the level upon which the mower is working but this is old and well known to those familiar with mowing machinery.

It is observed that since the arm 21 rests against the stop 22 of the shoe W⁶, and that the arm 24 bears against the stop portion 23 of the arm 21 a practically rigid arm is formed from the point of connection of the chain 20 with the arm 24 down to the point where the shoe is pivoted to the yoke 2. This rigid arm made up of the several members described constitutes a long lever which extends well above the pivot of the shoe on the yoke 2 lying practically at right angles to the finger bar by which the weight of the latter can be readily lifted. It is clear, however, that a direct lift through the foot lever 17 and the link 19 would lift the yoke 2 and the shoe from the ground from the fact that the pull would be substantially at right angles to the direction from which the bars 3 and 4 extend from their points of pivotal connection with the mower frame.

Attention is now directed to the detailed construction of the hand lever 9 before referred to, and also to the separate as well as the joint actions of the foot and hand levers. In dotted lines in several of the figures, two ribs are shown at 28 and 29 as parts of the foot lever casting 16. These are above the position of the stud 13 on which that casting rocks and extend from the inner side of the same, the rib 28 being somewhat shorter than the rib 29. In addition, the casting has a rib 30, Fig. 7, rearward from the ribs mentioned and which lies in the same plane therewith. In lifting the outer end of the finger bar to raise it over a stump or other obstruction, the foot lever 17 is depressed and carried to the position shown in Fig. 7. In this figure the said foot lever has been carried down as far as the mower axle which is sufficient to lift the outer end of the foot lever casting 16 and its link 19 to a proper height to lift the said finger bar as high as necessary. This action results without disengaging the clutch portions since the operating parts for the latter are not in any way connected with said lever and the height to which the finger bar is raised is not sufficient to require the disengagement for safety to the driving pitman. After the obstruction has been passed the foot lever is released and the finger bar descends to the ground by gravity. If desired, however, this same extent of lift can be accomplished by means of the hand lever 9 whose lug 12 in the rearward movement of the lever will meet the rib 30, Fig. 6. The use of the hand lever in this way causes the disengagement of the clutch portions since the lug $W^2$ of the said hand lever in moving forward and upward will rock the shaft V and accomplish the disengagement referred to. This is desirable when it is the wish to move some distance through the field to some new cutting point, for example, and when it is not wholly necessary to raise the cutter bar to its full height and where it is safer to persons in the field to have the said sickle remain at rest, and to reduce the draft.

When it is the desire to raise the finger bar to its vertical or highest position after the clutch parts have been separated the foot lever 17 is depressed, as before, bringing the casting 16 to the position shown in full lines in Fig. 7. Now, the hand lever 9, which has remained in its vertical position, is moved rearwardly to complete the raising movement and just here it is to be observed by referring to Fig. 6 that the rib 29 lies forward of and entirely out of the range of movement of the lug 12 of the hand lever as that member swings about its axis. But when the foot lever casting 16 having said rib 29 is raised to the position just described said rib 29 is brought into the path of said lug from the fact that the axis of the hand lever is spaced rearwardly from the axis about which the casting 16 moves, i. e. the stud 13. Therefore, said lug 12 will meet the rib 29 and as the hand lever moves rearwardly and is carried to a horizontal position, as shown by broken lines at the left of Fig. 7, the casting 16 must be raised to its highest point as indicated by broken lines in the figure referred to.

During this entire operation the foot lever has first raised the outer end of the finger bar through the link 27 and the arms 21 and 24. Following this movement the shoe and the coupling frame are raised until the push bar 4, meets some portion of the frame of the mower as, for example, a stop X, Figs. 2 and 6. The coupling frame having been limited by said stop the continued upward movement of the foot lever now brings the cutter bar to its vertical or highest position.

The hand lever 9 is provided with any usual latch mechanism 31 indicated in broken lines in Figs. 2, 6 and 7. In the forward position of said lever 9 said latch 31 engages a tooth 32 of the casting 5 preventing said lever 9 from moving farther forward. Since the latter stands slightly forward of the vertical position gravity assists in retaining it in its upright position together with the friction existing between said latch and the casting 5.

The shoe $W^6$ is prevented from dropping too far into low places through contact of the rib 30 of the casting 16 with the lug 12 of said hand lever and the tooth 32 against which the latch 31 lies. When the hand lever is acting to sustain the casting 10 in its highest position its latch engages beneath a tooth 33 of said casting 5; see Figs. 7 and 8.

A point of considerable importance and an advantage that I consider new in mower structures is that of the ability of the hand lever to provide for the positive return of the finger bar to its cutting position. This is a requirement when making use of the usual lifting spring indicated at 34 which as in Fig. 1 is attached at its forward end to the tongue D, its rear end having connection with a link 35 pivoted to the casting 16 at substantially the point 36. When the finger bar lies upon the ground in position for work the spring cannot exert its greatest pull from the fact that, as shown in Fig. 2 for example, its line of pull lies close to the axis of the foot lever, the stud, where it cannot act upon said lever. In raising the latter to lift the finger bar, however, as already described herein, the point of connection of the link 35 with the lever at the point 36 is carried downward farther and farther away from the pivot of said foot lever giving the spring an ever increasing leverage to assist the operator in the lifting movement. However, when the finger bar and the other portions of the apparatus are being lowered the tension of the spring works against the operator and must be overcome and this is accomplished by causing the casting 16 to be positively forced downward. Therefore, in raising the hand lever from the horizontal position shown in Fig. 7 the lug 12 is brought against the rib 28 and a continued forward movement pushes the casting forward and downward operating against the pull of the spring until the point 36 of the link is carried near enough to the pivot of the casting 16 so that the weight of the cutter bar and coupling frame can now complete the downward movement by gravity, their weight being now greater than the pull exerted thereon by the spring. In some mower structures it often happens that the pull of the lifting spring is too great, the exact adjustment of the same being difficult to find and maintain and the operator has no control of it nor of the finger bar in its return to the ground. The latter is thus left to itself and must often be grasped and thrown down by hand but before this is done the clutch is often thrown into engagement resulting in damage to the pitman and other parts. It is my purpose, therefore, to provide means for eliminating these difficulties. In lowering the foot lever through the hand lever the finger bar first moves outward from the vertical position, then the coupling frame drops to the ground and the finger bar falls at its outer end, the operation being directly the reverse of that described as to the raising movement, and only after the finger bar has reached a safe position for operation through the pitman can the clutch take hold, the timing being such that the hand lever having control of the clutch must travel a definite distance before the clutch takes hold and in that distance the sickle has arrived at a "safe" position for operation.

I now desire to draw attention to the simple manner of and means for "timing" the sickle and alining the finger bar. The drag bar 3 by which the timing is done is pivotally hung in a plate 37 provided with slots 38 and adjustable on an arm 39 of the frame A through bolts 40. Said bar is held in any suitable manner in said plate and by loosening the bolts the plate and the bar can be shifted in the direction of the yoke 2 to accomplish the desired "timing" adjustment.

In alining the finger-bar the push bar 4 described is adjustable through screw threads in the coupling of the yoke 2. Its other end is pivoted on a bolt 41 extending through it and a pair of lugs 42 depending from the axle of the mower, see Fig. 4. After withdrawing the bolt the bar is rotated to the desired extent to bring the finger bar into alinement with the pitman G whereupon the said bolt 41 is replaced in the described parts.

In order to furnish a stronger mower frame I connect that part of said frame carrying the shaft H with the part to which the tongue D is attached, by means of a bar 43. One end is secured to the arm 39 of the frame by the bolts 40 that secure the plate 37 upon said arm and the other end is secured to a lug 44 cast with the part to which said tongue is secured, see Figs. 6 and 7. This results in a lighter frame than is possible when the frame is cast in a rectangular form as done by some makers and said frame is stronger and requires less work than in casting it and no machine work is needed since the bolt holes in the cast frame are cored out.

The clutch operating means described herein is found to operate in an absolutely positive manner and is believed to be novel in its structure.

Having described my invention, I claim:—

1. In a mowing machine, the combination of a coupling frame, a lifting lever, means connecting the lever and said coupling frame, and a second lever having a part to engage the first described lever, the axes of the levers lying eccentric to one another.

2. In a mowing machine, the combination of a coupling frame, a lifting lever, means connected between the lever and said coupling frame and suspended from said lever, a second lever having a part to engage the first, the axes of the two levers lying eccentric to one another.

3. In a mowing machine, the combination of a coupling frame, including a finger bar, a lifting lever including an extension, means connected between the lever and the frame, a second lever having the axis of its pivotal movement disposed eccentrically to that of the first said lever, and having a part to engage the extension of said first lever.

4. In a mowing machine, the combination with a finger-bar and a raisable part to carry it, of a lifting lever including an extension, means connected between the lever and said part for raising the latter, and a second lever having its axis disposed eccentrically to the axis of the first said lever and including a part to engage the extension of said first lever, the latter in its movement carrying its extension into the path of the part carried by the said second lever.

5. In a mowing machine, the combination with a part to be lifted including a finger-bar, of a lever to lift said part and including an extension, mechanism connecting the lever and the said part, a second lever having its axis of movement eccentric to that of the first said lever and including an extension to engage that of the first said lever and normally removed from the path of movement of the same, the movements of the levers to lift the part causing their extensions to be brought into the path of one another.

6. In a mowing machine, the combination with a coupling frame and a finger bar, of a lever-mechanism connected to the same for initially raising it and including an extension on the lever, and a second lever having its axis of movement substantially parallel to and spaced from that of the first, said second lever likewise including an extension adapted to engage the extension of the first said lever.

7. In a mowing machine, the combination with a coupling frame and a finger bar, of a lever to impart an initial raising movement thereto, mechanism connecting the lever and frame, said lever including a pair of extensions, a second lever mounted parallel to the first lever, its axis of movement being substantially parallel to and spaced from that of the first lever, said second lever including a part to enter between the extensions of said first lever.

8. In a mowing machine, the combination with a coupling frame and a finger bar, of a lever to impart an initial raising movement to it, mechanism connecting the lever and frame for assisting in said raising movement, a second lever lying substantially parallel to the first, the axes of the two levers being substantially parallel and spaced from one another, two extensions on the first said lever, and an extension on the second described lever to alternately engage said extensions in the raising and lowering movement of the said first lever.

9. In a mowing machine, the combination of a coupling frame and a finger bar, a foot lever, means connecting the lever and the frame, a second lever movable substantially parallel to the first, its axis of movement being parallel to the axis of the foot lever and spaced from it, an extension on the foot lever, a part on the said second lever to engage said extension for moving the foot lever in one direction, and a second extension on the latter engaged by the said part to move said foot lever in the other direction.

10. In a mowing machine, a coupling frame and a finger bar, a lever and means connecting it with the frame, a second lever movable parallel to the first lever, its axis of movement being parallel to the axis of the latter and spaced from it, an extension on the said first lever, a part on the second lever to engage said extension when the latter has reached a predetermined position, and a second extension on the first lever in position to be engaged by said part.

11. In a mowing machine, the combination with its main frame and a coupling frame and a finger bar, of a lever and means connecting it and the coupling frame, a spring connected between the lever and part of the main frame adapted to support a portion of the weight of said coupling frame, a second lever movable parallel to the first lever and having its axis of movement parallel to and spaced rearward from the axis of the same, an extension on the latter, a part on the second lever adapted when the latter is moved to be brought into the path of movement of and to engage said extension when the first named lever has been raised to a predetermined height, and a second extension on the first named lever also engaged by said part for returning the last named lever to its initial position.

12. In a mower, the combination with a finger bar, of a pair of associated levers adapted to move in parallel planes and having their axes substantially parallel to and spaced from one another, means connected between one of the levers and said finger bar for lifting the latter, a part extending from one of the levers, and an extension on the other of the levers engaged by said part when moved to a predetermined position in the raising movement of said finger bar.

13. A coupling frame and finger bar, a pair of levers movable in substantially parallel planes, their axes of movement being spaced from one another, means carried by one of the levers engaging the coupling frame and finger bar for lifting them, a part extending from the other lever and an extension on the first named lever engaged by said part when the said first named lever has reached a predetermined position in its raising movement.

14. The combination with a coupling frame, a finger bar pivoted relatively to it and an extension uprising from the former, of an arm pivoted relatively to the finger-bar, means to limit the pivotal movement of the arm relative to said finger bar, an arm pivoted to the first said arm, there being a part on one of the arms to limit the movement of the two arms relatively, and a flexible member attached to the second described arm and extending through the said extension of the frame.

15. The combination in a mowing machine, of a coupling frame including a shoe carried by and pivoted relatively thereto and an extension uprising from the outer end of said frame, and a finger bar, an arm pivoted at one end to the shoe, means to limit the movement of the arm relatively to the latter in one direction of its movement, a second arm pivoted at one end to the free end of the first, means to limit the movement of the arms relatively, a flexible part attached at one end to the second arm and extending beneath a part of the extension of the coupling frame, and means for lifting the finger bar and to which the flexible member is attached.

16. The combination with the frame of a mower, of a finger-bar pivoted relatively to it, an extension uprising from the frame, a jointed arm pivoted relatively to the finger-bar, means stationed at the joint of the arm and means on the finger-bar adjacent to the pivot about which the finger-bar swings for limiting the movement of the parts of the arm relatively and relative to said finger-bar, a flexible member attached to the arm and carried by the extension on the frame, and means to draw the said flexible member through the extension to lift the finger-bar.

17. A mower including in its construction a main frame, a coupling frame and a finger-bar, a casting secured on the main frame including a cylindrical extension and a stud extending from it eccentric to the cylindrical surface of said extension, a lever mounted between its ends on said stud, mechanism connecting the lever and the coupling frame, an extension on the lever, a second lever mounted upon the cylindrical extension as the support upon which it turns, and a part carried by the said second lever to engage the extension of the first said lever.

18. A mower including in its construction a main frame, a coupling frame and a finger bar, a casting secured on the main frame including a cylindrical extension and a stud extending from it eccentric to the cylindrical surface of said extension, a lever mounted between its ends on said stud, mechanism connecting the lever and the coupling frame, a pair of extensions on the lever, a second lever mounted upon the cylindrical extension, and a part carried by the said second lever adapted in the movement of the latter to enter between the extensions of said part and to engage either.

19. In a mower, in combination, its main frame, a coupling frame including a finger bar, a lever on the said main frame, means connecting the lever with the coupling frame and the finger bar, an extension carried by the lever, and a second lever having a part to engage the extension, the paths of movement of the extension and the part on their respective levers being described from different centers and adapted to merge in the movement of said levers to cause the part and said extension to be brought into engagement whereby one of the levers will carry the other to its extreme of travel.

20. In a mowing machine, the combination with a frame, a finger-bar, and a shoe pivoted relatively to it, of a lever to impart an initial raising movement to the finger-bar, means connecting the lever and the shoe for lifting the finger-bar by means of the former, said lever including two extensions, a second lever having its axis of movement parallel to that of the first lever and spaced rearward therefrom and including an extension to enter the path of the extension of the said first lever and engage one of them to complete the raising movement of the finger-bar, said extension of said second lever engaging the other of the extensions to assist in returning the parts to their position for operation.

In testimony whereof I affix my signature, in presence of two witnesses.

ERNEST C. SMITH.

Witnesses:
 ELSIE WILKINSON,
 L. O. EAGLETON.

Copies of this patent may be obtained for five cents each, by addressing the "Commissioner of Patents, Washington, D. C."